United States Patent Office 2,758,070
Patented Aug. 7, 1956

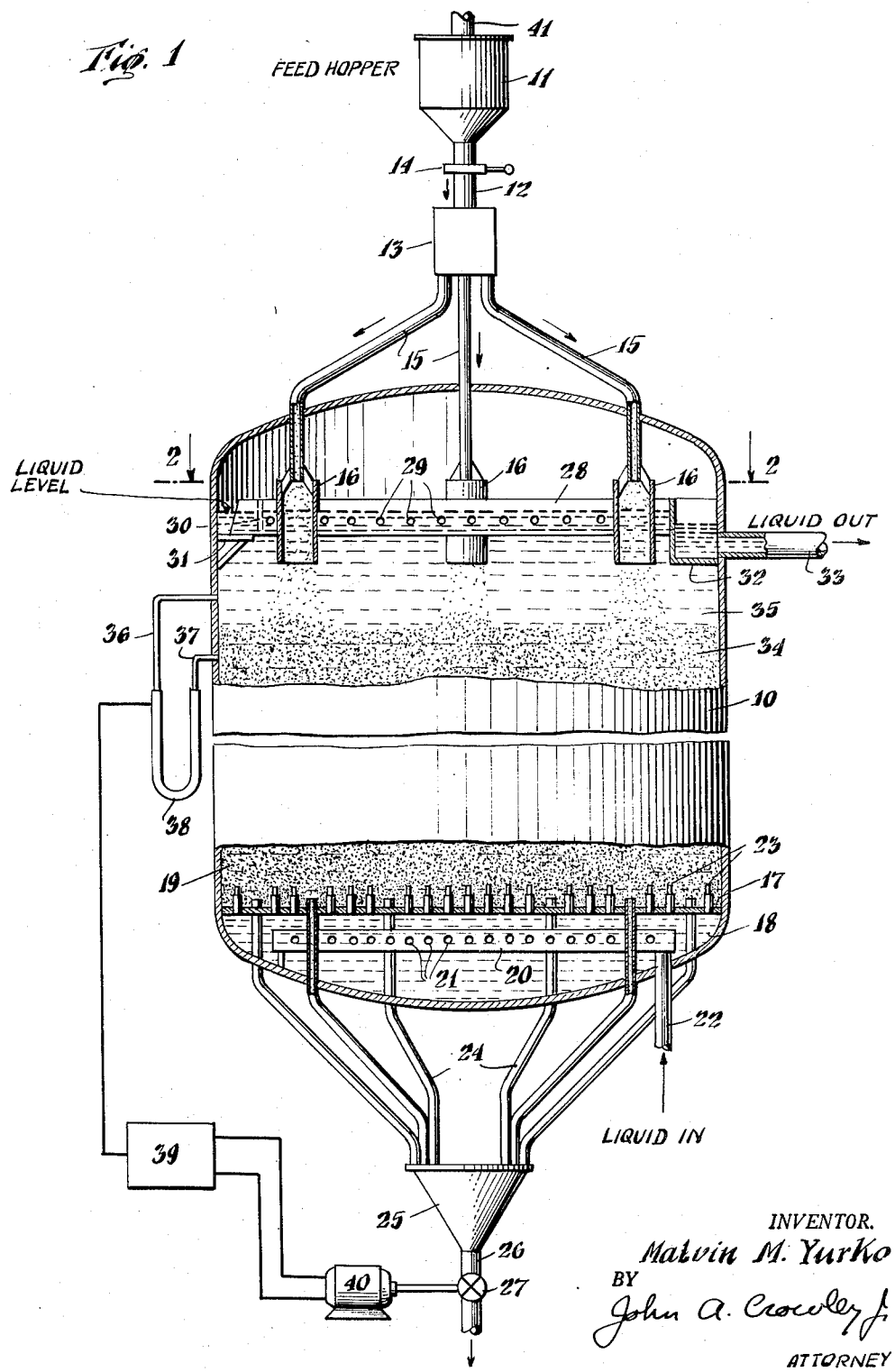

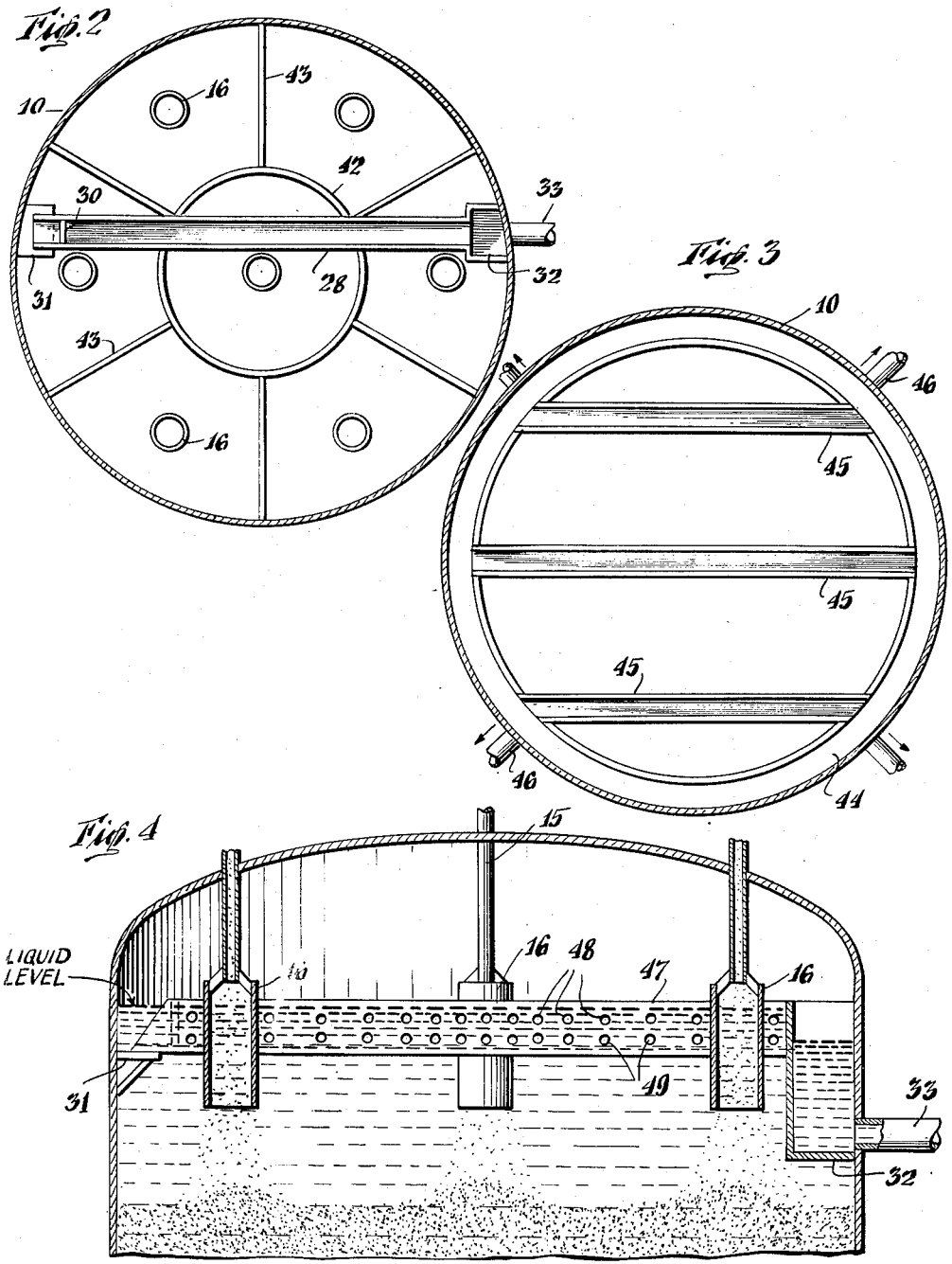

2,758,070

CONTACTING OF LIQUID AND GRANULAR SOLIDS

Malvin M. Yurko, Brooklyn, N. Y., assignor to Socony Mobil Oil Company, Inc., a corporation of New York Application January 10, 1952, Serial No. 265,832

11 Claims. (Cl. 196—147)

This invention has to do with a method and apparatus for contacting liquid with granular solids and particularly with continuous processes for contacting liquid and granular solids. More particularly this invention concerns the liquid withdrawal system of such processes.

Typical of processes to which this invention applies is that in which a liquid hydrocarbon oil is percolated upwardly through a downwardly gravitating bed of granular adsorbent to effect the removal of undesirable impurities from the oil. The adsorbent, after use, is revivified and returned to the percolator. Other processes to which this invention applies include percolation of a liquid upwardly through a fixed bed of granular solids and continuous countercurrent liquid-liquid extraction.

In processes of the above-mentioned type, the liquid-solid contacting normally is effected within an enclosed vessel. Liquid after contacting is removed from the upper section of the vessel through a pipe extending outwardly from one side of the vessel. This method of removal has several disadvantages. First, liquid is not withdrawn uniformly from the horizontal cross-section of the vessel, more liquid being withdrawn from areas closer to the pipe than those further removed. Second, channeling through the solids bed is promoted since liquid passing through the vertical section of the vessel immediately beneath the pipe will move at a higher velocity than liquid passing through vertical sections further removed from the pipe. This channeling results in non-uniform contacting of the liquid and solids and an inferior product. Third, this method results in entrainment of adsorbent in the high velocity liquid stream near the pipe with resultant losses of granular solids and increased operating costs. Loss of solids may be overcome by providing an increased disengaging space for liquid and solids before the liquid is withdrawn, but this results in a higher contacting vessel and increased construction costs.

A major object of this invention is to provide a method and apparatus for the contacting of liquids and granular solids which overcomes the above-described difficulties.

Another object of this invention is to provide, in a system for the countercurrent contacting of liquid and granular solids, a method and apparatus for withdrawing the liquid, after contacting the solids, uniformly from the horizontal cross-section of the contacting vessel.

Another object is to provide, in a system for the countercurrent contacting of liquid and granular solids, a method and apparatus for withdrawing liquid from the contacting vessel after contacting the solids which avoids substantial entrainment of granular solids in the liquid so withdrawn.

These and other objects of this invention will become apparent from the following discussion.

This invention involves a system in which liquid is passed upwardly through a bed of granular solids in a confined contacting zone. Liquid is withdrawn from the contacting zone by means of a substantially horizontal passage extending across the upper section of the contacting zone. Liquid enters this passage by means of a plurality of horizontally spaced apart openings intermediate the top and bottom of the passage. Liquid is removed from one or both ends of the passage by means of a second passage which passes out of the contacting chamber at a level below the bottom of the first passage so that liquid flows freely along the bottom of the first passage and there is no back pressure of liquid on the openings.

The term "substantially horizontal" and the like as used herein in describing and claiming this invention is intended to refer to passages or members which do not deviate from the horizontal by an angle greater than about 0.2 degree or passages or members the entire length of which is within at least 0.25 inch of a horizontal line extending from the higher end thereof. Similarly, the terms "orifice openings located at substantially the same horizontal level," "a plurality of streams spaced along a substantially horizontal line" and the like are intended to refer to a plurality of orifices, passages or streams which lie along a line which makes an angle with the horizontal not greater than about 0.2 degree or all of which deviate from a horizontal line through the uppermost of the orifices by not more than 0.25 inch. The term "granular" is used herein to refer to material in the form of pellets, tablets, capsules or spheres, or granules of regular or irregular shape having a palpable particulate form as distinguished from finely divided powdered material. The terms "confined passage," "horizontal conduit" and the like when applied to the passage into which treated liquid passes from the treating zone is used herein, in describing and claiming this invention, to include not only passages which are completely enclosed but also troughs, channels and the like which are open on top but with the top normally above the liquid column in the treating zone.

This invention may be best understood by referring to the attached drawings, of which, Figure 1 is an elevational view, partially in section, showing the application of this invention to a process for the continuous countercurrent percolation of hydrocarbon oils through a bed of granular adsorbent solids, Figure 2 is a sectional view taken along lines 2—2 of Figure 1, Figure 3 is a sectional view, similar to Figure 2, of a modified form of this invention, and Figure 4 is an elevational view, in section, of the upper section of a contacting vessel employing a second modification of this invention.

All of these figures are diagrammatic in form.

Figure 1 illustrates a continuous percolation process which is described in detail in U. S. patent application, Serial Number 177,408, filed August 3, 1950, now Patent 2,701,786. There is shown in Figure 1 a contacting vessel or chamber 10. A feed hopper 11 is positioned centrally above vessel 10 and a pipe 12 extends from the lower section of hopper 11 into a granular solids distributor 13. A slide valve 14 is provided on pipe 12 above distributor 13. A plurality of pipes 15 extend from distributor 13 into vessel 10 and terminate therein at horizontally spaced apart points on the same vertical level. Soaking devices 16 are attached to the lower ends of pipes 15. A transverse partition 17 extends across the lower section of vessel 10 so as to divide the lower section into a liquid plenum chamber 18 below the partition and a contacting chamber 19 thereabove. A liquid distributor conduit 20 with orifices 21 therethrough is fixed within plenum chamber 18. A liquid charge conduit 22 connects into distributor 20. A plurality of liquid nozzles 23 are spaced apart across partition 17 and act to transfer liquid from plenum chamber 18 into contacting chamber 19 uniformly across the horizontal cross-section of chamber 19. Suitable liquid nozzles are shown and described in United States patent application, Serial Number 237,265, filed July 17, 1951. A plurality of conduits 24 for granular solids extend from the lower section of contacting chamber 19, through plenum chamber 18, and terminate in collector 25. A suitable collector is shown and described in United States patent application, Serial Number 237,267, filed July 17, 1951. A conduit 26 with valve 27 thereon extends from the lower section of collector 25. Extending across the upper section of vessel 10 is conduit or channel 28, open on top. The conduit shown in Figure 1 is of rectangular cross-section but other shapes may be used within the scope of this invention. A plurality of horizontally spaced apart apertures 29 penetrate the side wall of conduit 28 at a level intermediate its top and bottom. One end of conduit 28 is closed off by means of closing plate 30 and this end is supported from the wall of vessel 10 by support member 31. The opposite side of conduit 28 is attached to a receptacle or trap 32 which is attached on its opposite end to the wall of vessel 10. Receptacle 32 is open on top and extends downwardly to a level below the bottom of conduit 28. A conduit 33 extends into receptacle or trap 32 from the exterior of vessel 10 at a level below the bottom of conduit 28.

In operation, a granular adsorbent solid of palpable particulate form gravitates from feed hopper 11 downwardly through pipe 12. Typical granular adsorbents include fuller's earth, bauxite, bentonite and bone char, charcoal, magnesium silicate, heat and acid activated kaolin, and activated carbon. The adsorbent employed should be made up of palpable particles of the size within the range about 4–100 mesh and preferably about 10–60 mesh and still more preferably 15–30 mesh by Tyler Standard Screen Analysis. Adsorbent flows from conduit 12 into distributor 13 which acts to split the stream from 12 into a plurality of smaller equal streams which flow downwardly through conduits 15. A suitable distributor is shown and described in United States patent application, Serial Number 237,264, filed July 17, 1951. Granular adsorbent flows from conduits 15 into soaking tubes 16 which act to thoroughly wet the adsorbent with liquid oil before it enters the main body of vessel 10 and thereby reduce entrainment in the effluent liquid. Suitable soaking tubes are described in United States patent application, Serial Number 237,268, filed July 17, 1951. Adsorbent falls from the lower section of soaking tubes 16 onto a bed of granular adsorbent 34 maintained therebelow. The upper surface of bed 34 is maintained at a level below soaking tubes 16 and conduit 28 by means of a level control device so that a liquid-solid disengaging zone 35, containing a column of liquid, is provided above bed 34 in the upper section of vessel 10. A suitable level controlling device is described in United States patent application, Serial Number 387,744, filed October 22, 1953. This device consists of pressure taps 36 and 37 located above and below the desired bed surface level. Taps 36 and 37 connect to a manometer 38 which acts to measure the pressure drop of liquid flowing through that portion of the bed between taps 36 and 37. Since this pressure drop is a function of bed height, it serves as an indication of bed height. The pressure drop also serves to actuate controller 39 which in turn operates motor 40 and valve 27 to increase or decrease the withdrawal of adsorbent from contacting zone 19. Adsorbent passes through the contacting zone as a downwardly gravitating bed and is discharged from the lower section of zone 19 by means of conduits 24 which discharge into collector 25 from which adsorbent is removed by means of conduit 26. Liquid hydrocarbon oil, such as a deasphalted lubricating oil, is charged to vessel 10 through conduit 22. Liquid charge passes into distributor 20 and then into plenum chamber 18 by means of orifices 21. Charge oil passes from the plenum chamber by means of nozzles 23 into the lower section of contacting zone 19 and then upwardly through zone 19 countercurrently to the downwardly gravitating adsorbent to effect the desired treatment. This treatment may include the decolorization, neutralization, removal of suspended, colloidal or dissolved impurities such as carbon or coke or oxygen and nitrogen-containing impurities and other gum-forming compounds, and improvement of the demulsibility properties of the oil. Liquid product passes from the upper end of contacting zone 19 which is defined by the surface level of bed 34 into disengaging zone 35 in which entrained solids drop out of the liquid. The treated liquid passes upwardly through the disengaging zone as an upwardly moving liquid column above the columnar mass or bed of absorbent. Liquid passes from the upper section of the liquid column in the disengaging zone into conduit 28 as a plurality of horizontally spaced apart streams by means of orifices 29. Orifices 29 act to withdraw liquid uniformly across the entire cross-section of vessel 10. Liquid passes from conduit 28 as a freely flowing stream into receptacle 32 from which the product is removed by pipe 33. Trough 28 is of such an internal cross-sectional area at a level below orifices 29 that it has a flow capacity greater than the total flow capacity of all of orifices 29 and liquid is withdrawn from conduit 28 at a rate sufficient to maintain the liquid level in the conduit below the bottom of orifices 29. Thus there will be no back pressure on the flow of liquid through the orifices. The positioning of withdrawal pipe 33 at a level below the bottom of trough 28 acts to maintain this low liquid level in the trough when the flow capacity of the trough and pipe are sufficiently high. The spacing of orifices 29 should be determined by dividing the horizontal cross-section area of vessel 10 at a level adjacent to conduit 29 into segments of equal area, the number of the segments being the same as the number of the orifices. The orifices should then be spaced so that one orifice is centrally located in each of the area segments. While this spacing is preferable, it is not necessary within the broader scope of this invention. If it were possible to maintain all of the orifices at precisely the same level in vessels of large cross-sectional area, it would not be necessary for the orifices to run full of liquid at all times. However, as a practical matter, in commercial sizes, due to slight deviation of the channel 29 from the horizontal or due to slight warping thereof, or due to practical error in alignment of the orifices, the latter may vary slightly above or below a single horizontal line. For this reason, orifices 29 should be of such a size and number and liquid should be charrged to the vessel at such a rate that all of orifices 29 are submerged. This tends to minimize the error due to the deflection of channel 28 or slight misalignment of the orifices since the flow through the orifices varies only as the one half power of the head of liquid thereabove. On the other hand, if a series of open-topped weirs were used or if the liquid allowed to spill over the top of conduit 28 or if the orifices did not run full the flow through any orifice or weir or over any point at the top of channel 28 would vary so the three-halves power of the head thereabove. Thus by operating with the orifices full the error due to the misalignment of 28 is minimized. By having the top of conduit 28 open a means for discharging liquid from the vessel, should any surge in the liquid flow rate occur, is provided. Liquid product flows freely through conduit 28 into receptacle 32, the upper surface of the liquid being below the bottom of openings 29. Liquid is discharged from receptacle 32 through conduit 33 which is placed at a level below the bottom of conduit 28 so that liquid does not build up in channel 28 and exert a back pressure on the streams flowing through orifices 29. Used granular solids removed from collector 25 may be passed to a suitable washing, drying and revivification means. In general, the revivification is conducted in a kiln wherein the contaminants thereon are removed and the granular solids are restored to their original condition. The solids may then be returned to hopper 11 by means of conduit 41.

Figure 2 is a sectional view taken along line 2—2 of Figure 1 and like parts in both figures bear the same numerals. Figure 2 shows the positioning of conduit 28 and soaking devices 16 in the upper section of vessel 10. Conduit 28 is not placed on a diameter of vessel 10 since it is desirable that soaking devices 16 be spaced equidistant one from the other to insure a uniform granular solids bed depth throughout vessel 10.

Also, shown in Figure 2 is a centrally placed upright cylinder 42 which extends through the section of vessel 10 containing bed 34. Uniformly spaced apart vertical partitions 43 extend radially outwardly from cylinder 42 to the walls of vessel 10 and also extend through bed 34. Cylinder 42 and partitions 43 are not shown in Figure 1 and have the function of reducing the lateral or backward movement of granular solids through the solids bed 34. This partitioning is described and claimed in United States patent application, Serial Number 272,584, filed February 20, 1952.

Figure 3 is a sectional view, similar to Figure 2, of a vessel employing a second form of the liquid draw-off of this invention. An annular receptacle 44 extends completely around the inner periphery of vessel 10. Extending across the vessel and across the space enclosed by receptacle 44 are a plurality of conduits 45 for liquid withdrawal. Conduits 45 all lie in substantially the same horizontal plane. Each of these conduits has a plurality of orifices in its sides (not shown) similar to conduit 28 of Figure 1. Liquid enters conduits 45 and flows into receptacle 44 from both ends of the conduits. Receptacle 44 extends downwardly to a level below the bottom of conduits 45. Liquid is discharged from the lower section of receptacle 44 by means of a plurality of conduits 46. Conduits 46 pass through the walls of vessel 10 at a level below the bottom of conduits 45.

Figure 4 illustrates another modification of this invention and like parts in Figure 4 and the preceding figures bear the same numerals. The apparatus shown in Figure 4 is, in general, similar to that of Figure 1 but the liquid withdrawal conduit 47 of Figure 4 has two rows of horizontally spaced apart apertures 48 and 49, rather than the single row 29 shown in Figure 1. The orifices of rows 48 and 49 may both function as described in connection with Figure 1, the orifices in both rows being submerged in the liquid. Alternatively, the upper row may act as a drawoff for liquid when a surge in the liquid rate occurs. In this latter case only the lower row 49 will be submerged in normal operation. When row 48 acts to withdraw overflow liquid the top of conduit 47 may be closed and conduit 47 may be of the form of a pipe having two rows of spaced apart orifices.

As previously stated, all of the orifices 29 or 48 in the method of this invention should be submerged in the liquid column. Generally, these orifices should be submerged by at least an amount within the range about ⅛ to 3 inches. Preferably the submergence should be at least an amount determined by the following equation:

$$S = \frac{d}{2} + 9e$$

where $S$ = submergence in inches measured vertically from the center of the lowest orifice,
$d$ = orifice diameter in inches,
$e$ = vertical alignment difference between the highest and lowest orifice in inches (within the range 0 to ¼ inch).

Conduit 28 should be a distance within the range about ½ to 8 feet above the upper surface of the bed of granular solids and preferably at least 3 feet above this bed. Where this invention is used in processes for the continuous percolation of liquid hydrocarbon oils conduit 28 should preferably be an amount above the bed surface determined from the following equation:

$$H = \frac{(1.63 \log R - \log E - 2.78)Z}{1730 D_P{}^2 \left(\frac{S_a}{1-F}\right)\left(1 - \frac{S_l}{S_t}\right)}$$

where $H$ = height of conduit above bed surface (disengaging height) in feet; $R$ = superficial oil rate through the contacting vessel in bbl. (42 gal.) per day per sq. ft. of vessel cross-section; $E$ = allowable adsorbent entrainment loss in lbs. of adsorbent per bbl. of liquid product; $Z$ = liquid viscosity, in centipoises; $D_P$ = average adsorbent particle diameter in inches; $S_a$ = apparent density of adsorbent in gm. per cc.; $F$ = fractional void volume at density $S_a$; $S_l$ = liquid density at temperature corresponding to $Z$ in gm. per cc.; $S_t$ = true density of adsorbent in gm. per cc. $H$ should be within the range about 3 feet to 6 feet; $R$ should be within the range about 10 bbl./day/sq. ft. to 20 bbl./day/sq. ft.; $E$ should be within the range about 0.02 lb./bbl. to 0.06 lb./bbl.; $Z$ should be within the range about 4 centipoises to 5 centipoises; $D_P$ should be within the range about .031 inch to .039 inch; $S_a$ should be within the range about 0.56 gm./cc. to 0.80 gm./cc.; $F$ should be within the range about 0.25 to 0.40; $S_l$ should be within the range about 0.790 gm./cc. to 0.830 gm./cc.; and $S_t$ should be within the range about 0.95 gm./cc. to 1.40 gm./cc.

Conduit 28 and orifices 29 therein should be at a level above the discharge end of soaking tubes 16. Generally, orifices 29 should be at a level within the range about one foot to 4 feet and preferably within the range about two feet to three feet above the lower ends of the soaking tubes. The upper surface of the liquid column within disengaging zone 35 should be at a level about 1½ feet to 4½ feet and preferably about 2½ feet to 3½ feet above the lower ends of the soaking tubes. The soaking tubes should, further, terminate above the upper surface of the contact material mass, generally about one foot to three feet and preferably about one foot to two feet thereabove.

A suitable construction of an apparatus according to this invention was applied to a 14 foot 6 inch O. D. cylindrical vessel for use in a continuous percolation process. A channel similar to conduit 47 of Figure 4 was used. The channel was 13 feet long and open on top. Two rows of 9 orifices each were provided in the wall of the channel. One orifice in each row was at the center of the channel and orifices were spaced a distance of one foot, two feet three inches, three feet nine inches and five feet six inches from the center on each end of the conduit in each row. The orifices were ⅞ inch in diameter. The channel was 6 inches wide and 8 inches high. The upper row of orifices was 1½ inches from the top of the channel and the lower row of orifices was 4½ inches from the top of the channel. The channel connected on one end to a receptacle whose top was aligned with the top of the channel. The receptacle was 20 inches high and 16 inches wide. A six inch pipe extended into this receptacle from the exterior of the vessel at a level 15 inches below the top of the receptacle. The channel was placed with its bottom a distance of 16 inches from the bottom of the soaking devices 16 and about 36 inches from the top of the adsorbent bed. The oil charge rate was about 3000 bbl. per day while the adsorbent charge rate was about 50 tons per day.

This invention should be understood to cover all changes and modifications of the example of the invention herein chosen for purposes of disclosure which do not constitute departures from the spirit and scope of the invention.

What is claimed is:

1. A process for contacting palpable particle form solids with liquid which comprises: maintaining a bed of palpable particle form solids throughout the lower section of a confined contacting zone, removing solids from the lower section of said bed, replenishing the supply of solids in said bed by supplying solids to the upper section of said bed, passing liquid charge upwardly through said bed, discharging liquid after contact with said bed into a substantially horizontal passage maintained at a level above the upper surface of said bed through a plurality of horizontally spaced apart passages intermediate the upper and lower sides of said horizontal passage, charging liquid charge to the lower section of said bed at a rate and pressure sufficient to maintain the liquid level in said contacting zone at a height at least 1/8 inch above the upper edges of said plurality of passages, and removing liquid from said first-named passage to the exterior of said zone by means of a passage maintained at a level below the underside of said first-named passage and thereby maintaining the level of liquid in said first-named passage below said plurality of horizontally spaced passages.

2. A process for contacting palpable particle form solids and liquid which comprises: maintaining a bed of palpable particle form solids throughout a confined contacting zone, removing solids from the lower section of said bed and supplying solids to the upper section of said bed, maintaining a disengaging zone for liquid and solids above said bed, passing a liquid charge upwardly through said bed to effect the desired contacting and then upwardly through the disengaging zone, discharging liquid from the upper section of said disengaging zone into a substantially horizontal passage extending across said zone through a plurality of horizontally spaced apart passages maintained in said first-named passage intermediate its top and bottom, introducing liquid charge to the lower section of said bed at a rate such that the lowest of said last-named plurality of passages are submerged at least an amount defined by the equation $$S = \frac{d}{2} + 9e$$

where $S$=submergence in inches measured vertically from the center of the lowest passage, $d$=diameter of said passages in inches, and $e$=vertical alignment difference between highest and lowest of said passages in inches, within the range 0 to 1/4 inch, and withdrawing liquid from said first-named passage by means of a passage maintained at a level below the bottom of said first-named passage and thereby maintaining the level of liquid in said first-named passage below said plurality of horizontally spaced passages.

3. A process for contacting granular solids of palpable particulate form and liquid which comprises: maintaining a bed of granular solids within a confining contacting zone, removing granular solids from the lower section of the bed and supplying granular solids to the upper section of the bed, maintaining a disengaging zone for liquid and granular solids above the bed, passing liquid charge upwardly through said bed to effect the desired contacting, passing the liquid after contacting the granular solids upwardly through the disengaging zone to free the liquid of entrained granular solids, discharging liquid from the upper section of the disengaging zone into a substantially horizontal passage extending across the upper section of the disengaging zone through a plurality of horizontally spaced apart passages in said first-named passage intermediate the top and bottom of said first-named passage, the spacing of said last-named passages being determined by dividing the horizontal cross-sectional area of said disengaging zone into equal segments extending outwardly from said first-named passage, the number of said segments being equal to the number of said last named passages, and spacing the passages so that one passage serves each of said segments, introducing liquid charge to the lower section of said bed at a rate such that all of said passages are submerged in the liquid in the disengaging zone at least 1/8 inch but less than three inches, and removing liquid from said first-named passage by means of a passage at a level below the bottom of said first-named passage to maintain the level of liquid in said first-named passage below said last-named passages.

4. A process for contacting a liquid hydrocarbon oil with a granular adsorbent solid to remove undesirable impurities from the oil which comprises: maintaining a bed of granular adsorbent within a confined contacting zone, withdrawing adsorbent from the lower section of the bed and supplying adsorbent to the upper section of the bed whereby downward movement of the adsorbent through the bed is promoted, introducing liquid oil to the lower section of the bed and passing the liquid oil through the bed to effect the desired contacting, passing liquid after contacting into a substantially horizontal passage maintained at a level at least three feet above the upper surface of the bed, said liquid passing into said passage through a plurality of horizontally spaced apart orifices in said passage and said orifices being of such a size that all of said orifices are submerged in said liquid an amount within the range about 1/8 to three inches, and withdrawing liquid from said passage through a passage maintained at a level below the bottom of said first-named passage to maintain the level of liquid in said first-named passage below said orifices 5. A continuous process for contacting liquid hydrocarbon oils with an adsorbent of palpable particulate form to effect the removal of undesirable impurities from the oil which comprises: maintaining a bed of adsorbent within a confined contacting zone, removing adsorbent from the lower section of said bed and supplying adsorbent to the upper section of said bed whereby downward movement of the adsorbent through the bed is promoted, introducing liquid hydrocarbon oil into the lower section of said bed and passing the liquid oil through said bed to effect the desired contacting, passing liquid after contacting into a substantially horizontal passage across said zone by means of a plurality of horizontally spaced apart orifices in said passage intermediate its top and bottom, said orifices being so sized that all of said orifices are submerged in liquid an amount within the range about 1/8 to three inches and said passage being at a level above the upper surface of said bed an amount determined by the following equation:

$$H = \frac{(1.63 \log R - \log E - 2.78)Z}{1730 D_P^2 \left(\frac{S_a}{1-F}\right)\left(1 - \frac{S_l}{S_t}\right)}$$

where $H$=height of orifices in passage above the bed in feet within the range three to six feet, $R$=superficial oil rate through contacting zone in bbl. of charge per square foot of cross-section per day within the range of about 10 to 20 bbl. (42 gal.) of oil charged per square foot of contacting zone cross-section per day, $E$=adsorbent entrainment loss in lbs. within the range about 0.02 to 0.06 lb. of adsorbent per bbl. of liquid product, $Z$=viscosity of liquid charged in centipoises within the range about four to five centipoises, $D_P$=average particle diameter of adsorbent in inches within the range about 0.031 to 0.039 inch, $S_a$=apparent density of adsorbent in grams per cubic centimeter within the range about 0.56 to 0.80 gram per cubic centimeter, $F$=fractional void volume at density $S_a$ within the range about 0.25 to 0.40, $S_l$=liquid density at temperature corresponding to that at which Z was obtained in grams per cubic centimeter within the range about 0.79 to 0.83 gram per cubic centimeter, and $S_t$=the true density of the adsorbent in grams per cubic centimeter, within the range about 0.95 to 1.40 grams per cubic centimeter, and removing liquid from said first-named passage by means of a passage located at a lower level than the bottom of said first-named passage to maintain the level of liquid in said first-named passage below said orifices.

6. A process for contacting liquids and palpable particle form solids which comprises: maintaining a bed of palpable particle form solids within a confined contacting zone, removing solids from the lower section of said bed and supplying solids to the upper section of said bed, maintaining a liquid and solids disengaging zone above said bed, introducing liquid charge to the lower section of said bed and passing the liquid upwardly through said bed to effect the desired contacting, passing the liquid after contacting the bed through said disengaging zone to free the liquid of entrained solids, discharging liquid into a plurality of substantially horizontal passages lying in substantially the same horizontal plane as a plurality of horizontally spaced apart confined streams intermediate to the top and bottom of each of said passages, said streams being so sized that the inlet of said streams is submerged a distance within the range about ⅛ to three inches below the surface of the liquid in said disengaging zone and said plurality of passages lying in a plane a distance of greater than three feet above the upper surface of said bed, and removing liquid from said plurality of passages by means of a passage located at a level below the bottom of said plurality of passages and thereby maintain the level of liquid in each of said passages below said plurality of liquid streams entering the passage.

7. An apparatus for contacting liquid with palpable particle form solids which comprises in combination: a confined contacting chamber adapted to confine a bed to palpable particle form solids, means for introducing liquid charge into the lower section of said chamber, a substantially horizontal conduit extending across the upper section of said chamber and having a plurality of horizontally spaced apart orifices therethrough at a level intermediate its top and bottom, a receptacle connected to at least one end of said conduit, said receptacle having its underside at a level below the underside of said conduit and a passageway of greater horizontal cross-section than the total cross-section of said orifices extending from said receptacle at a level below said conduit to the exterior of said chamber, whereby the liquid level within said conduit is maintained below the undersides of said orifices.

8. An apparatus for the contacting of liquid with palpable particle form solids which comprises in combination: an elongated vessel adapted to confine a bed of palpable particle form solids, means for removing solids from the lower section of said vessel, means for supplying solids to the upper section of said vessel, means for supplying liquid charge to the lower section of said vessel, a substantially horizontal conduit open on top extending across the upper section of said vessel and having a plurality of horizontally spaced apart orifices along its length intermediate its top and bottom, a closure at one end of said conduit, a receptacle attached on one side to said conduit at the end opposite said closure and attached on the opposite side to the walls of said vessel and adapted to receive liquid from said conduit, said receptacle extending downwardly to a level below the bottom of said conduit, and a second conduit of substantially greater cross-sectional area than the total area of said orifices and extending through the walls of said vessel into said receptacle at a level below the bottom of said first conduit.

9. An apparatus for the contacting of liquid with palpable particle form solids which comprises in combination: an upright vessel adapted to confine a bed of palpable particle form solids, means for introducing solids to the upper section of said vessel, means for removing solids from the lower section of said vessel, means for introducing liquid charge to the lower section of said vessel, a plurality of substantially horizontal conduits extending across the upper section of said vessel, all of said conduits lying in the same horizontal plane and each of said conduits having at least one row of horizontally spaced apart orifices along its length, a receptacle extending around the inner periphery of said vessel and attached thereto, the ends of said conduits passing into said receptacle and said receptacle extending downwardly to a level below the bottom of said conduits, and a plurality of pipes of substantially greater horizontal cross-sectional area than the total area of all of said orifices and extending from said receptacle to the exterior of said vessel at a level below the bottom of said conduits.

10. A process for effecting countercurrent contact between a downwardly moving adsorbent of palpable particulate form and a liquid material which comprises: passing the adsorbent downwardly through a confined contacting zone as a columnar mass of particles, supplying liquid feed material into the lower section of said columnar mass and passing it upwardly therethrough to effect the desired contacting, maintaining a column of the contacted liquid above the surface of said columnar mass in said confined zone, introducing adsorbent feed into said zone as at least one confined stream discharging substantially below the surface of said liquid column and distributing said adsorbent onto the surface of said columnar mass, withdrawing adsorbent from the lower section of the columnar mass to promote downward flow of adsorbent therein, withdrawing contacted liquid from said liquid column into a confined passage extending substantially horizontally across said zone through a plurality of orifice openings entering into said passage at a level above its bottom and spaced apart across said zone on at least two horizontal levels below the surface of said liquid column and above the level of discharge from said adsorbent feed stream, the size and number of said orifice passages being proportioned substantially directly to the area of the liquid column served thereby, whereby liquid is withdrawn uniformly from all areas of said liquid column, causing the liquid to drop from said orifice openings onto a stream of said liquid along the bottom of said confined passage and withdrawing liquid from said last-named stream and from said confined contacting zone at a level below that of said orifice openings and at a rate sufficient to maintain said stream below the level of said openings and controlling the rate and pressure of liquid supply to said contacting zone to maintain the surface level of said liquid column within a narrow range of levels all of which are at least ⅛ inch above the uppermost of said orifice openings.

11. In a process for the continuous contacting of liquids with granular solids wherein the liquids are passed upwardly through a downwardly gravitating bed of granular solids in a confined contacting zone and a column of liquid is maintained above said bed, the improved method of withdrawing liquid from the upper section of said zone which comprises: removing liquid from said column of liquid as a plurality of confined streams spaced apart along a substantially horizontal line, all of said streams originating in said liquid column at a level at least ⅛ inch below the surface thereof, discharging said streams into a substantially horizontal passage across the upper section of said zone, removing liquid from said passage to the exterior of said zone and maintaining the level of liquid in said passage below the level of the undersides of said streams.

References Cited in the file of this patent

UNITED STATES PATENTS

| 2,051,149 | Nordell | Aug. 8, 1936 |
| 2,073,388 | Elliott | Mar. 9, 1937 |
| 2,092,620 | Kivell | Sept. 7, 1937 |
| 2,552,435 | Knox et al. | May 8, 1951 |
| 2,552,436 | Bennett et al. | May 8, 1951 |
| 2,601,676 | Trainer et al. | June 24, 1952 |
| 2,606,863 | Rehbein | Aug. 12, 1952 |

FOREIGN PATENTS

| 464,661 | Great Britain | Apr. 22, 1937 |